May 22, 1945.   H. M. J. T. DE POIX   2,376,583
PROCESS FOR PRESERVING PERISHABLE FOODSTUFFS
Filed Oct. 3, 1939
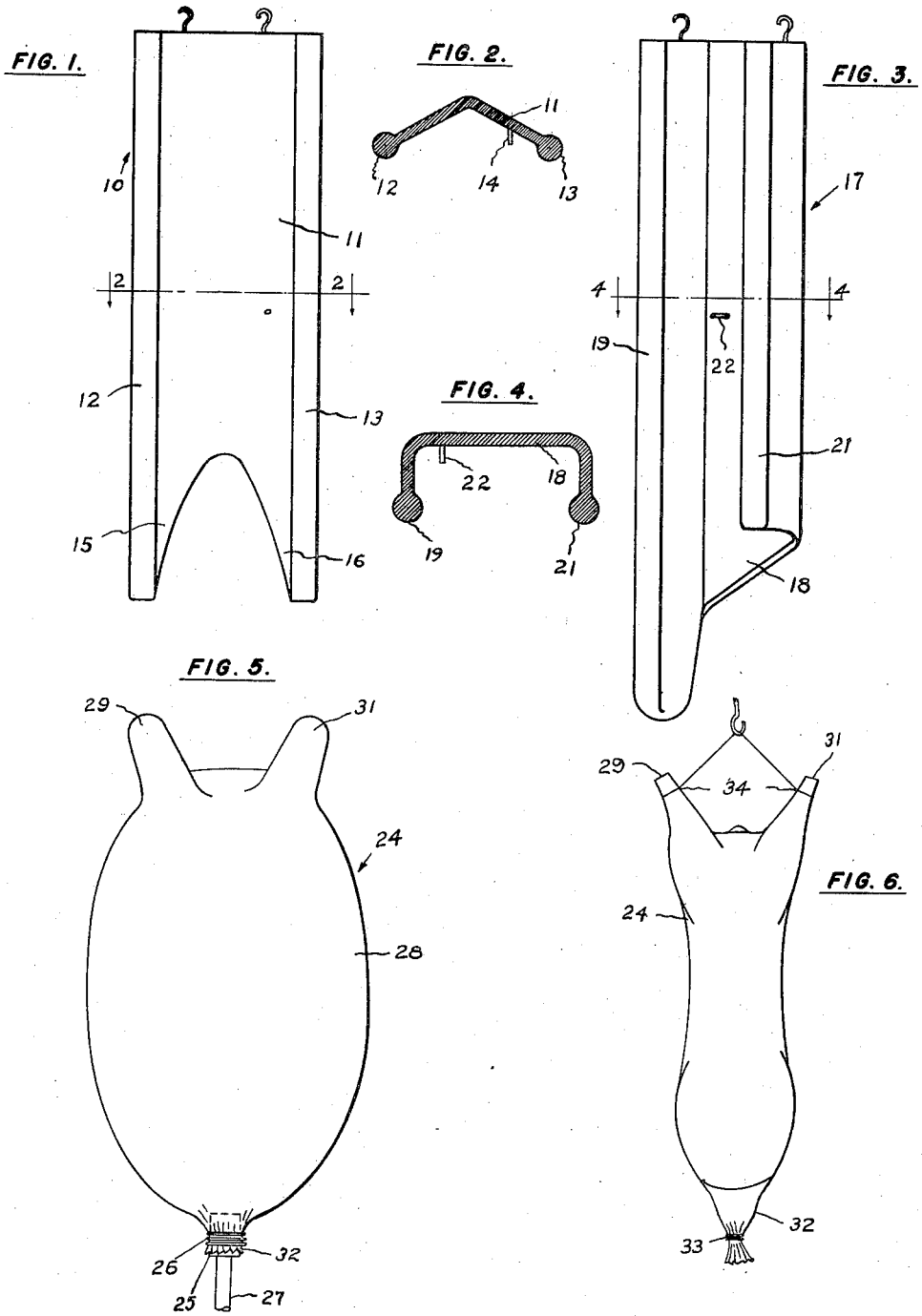
Henri M. J. T. DePoix
By Theodore C. Browne
Attorneys

UNITED STATES PATENT OFFICE 2,376,583

PROCESS FOR PRESERVING PERISHABLE FOODSTUFFS

Henri Marie Joseph Tyrel de Poix, Rueil, France; assignor to Dewey and Almy Chemical Company, Cambridge, Mass., a corporation of Massachusetts Application October 3, 1939, Serial No. 297,764
In France June 22, 1937

7 Claims. (Cl. 99—194)

This invention relates to the preservation of foodstuffs and is particularly concerned with the storage, ageing and freezing of such products, in impervious, flexible containers.

Although this invention is suitable for the preservation of any foodstuffs that may be preserved by refrigeration or freezing, it is particularly suitable for the preservation of meats, and, consequently, for convenience in description, I shall describe it as applied to the preservation of beef quarters and carcasses of smaller animals.

It has been proposed to enclose foodstuffs in flexible containers, for example, in vulcanized rubber sacks or bags of rubber hydrohalides, and after evacuating the bag, sealing it in such a manner that no air gains entrance. The meat thereafter may be chilled according to conventional practice or frozen, and, in this instance, very quick freezing may be brought about because the covered carcass may be directly immersed in the cold brine or sprayed or hosed down with the refrigerant. Since it is intended to store the foodstuffs in the envelopes for long periods of time, suitable materials must be permanent and have no ultimate effect on taste or odor.

The containers so far proposed, however, possess various serious drawbacks. If an ordinary rubber sack is used, the vulcanizing agents may contaminate the food with offensive tastes and odors, but the most serious defect associated with the use of rubber bags lies in the resilience of vulcanized rubber at low temperatures for, since the bags as they cover the meat are always distended somewhere, a puncture or a tear causes the rubber to pull away from the immediate vicinity of the tear and sometimes to split for such a distance that the covering is useless. To avoid this defect, the bags have been made from heavy material which causes them to be prohibitively expensive. Aside from expense, the production of such a large, heavy rubber envelope, presents a serious manufacturing problem in itself.

As a result, although the advantages of the hermetic wrapping of meats for freezing, storing or ageing has been understood and its effect on the prevention of losses by evaporation and trimming and the retention of juices which it secures is known, impervious sacks still are not used for the commercial preservation and storage of meat.

It is an object of this invention to produce thin, light and such relatively inexpensive envelopes that reuse is not necessary; to produce impervious envelopes which may be sealed in a dependable manner after evacuating or expelling the air; which possess the distinct advantage that they are dead and inelastic at chilling or refrigeration temperatures; that will not pull away and expose any large area of meat after puncture; that may be shrunk down onto the beef by a simple method to cause the covering to cling to the beef almost as if it were the skin of the animal; and to produce covers which, in their shrunken condition, are transparent and relatively free from wrinkles and folds; which permit the condition of the meat to be determined without the necessity of removing the bag and which present an attractive, salable, commercial, package.

A further object is to devise an envelope suitable for use in enclosing food products preparatory to preservation by refrigeration which may be conveniently evacuated and sealed after the product is placed in it.

I have found that the foregoing objects may be attained if the envelopes are made of an air and moisture impermeable material which remains substantially permanently odor and taste free, which shrinks when subjected to slightly elevated temperatures and is otherwise unobjectionable for use with food products. By making the envelopes of a heat shrinkable material and subjecting the package to an elevated temperature for a short time, the envelope may be contracted and thus brought into intimate contact with the food product, expelling the air in the envelope except such as may remain in cavities in the food product. By heat shrinkable material I mean a material which when subjected to heat contracts materially and thereafter on cooling retains its smaller dimensions. In other words, the envelope is in a state of physical instability at the time the foodstuff is introduced thereinto and then by releasing the forces which tend to restore the envelope towards its original size, it is caused to shrink into firm contact with the foodstuff. Unvulcanized rubber which has been stretched is an illustration of such a material and is the one which I prefer to use.

I proceed in the manufacture of such envelopes from unvulcanized rubber in the following manner:

A flattened form which, if desired, may be shaped into rough conformity with the carcass to be protected, may be dipped in a solution of rubber. Preferably, however, because a much thicker and stronger coating can be built up quickly on the dipping form, I prefer to dip the form in an aqueous dispersion of natural or artificial rubber, for example concentrated latex. Aside from the necessary bactericides and latex preservatives, the latex need not be further compounded, but dyes and pigments may be added to designate grades or trade-mark the articles. The deposit of rubber upon the form may be brought about by any of the well-known dipping procedures and, after a liquid coating of sufficient thickness has been deposited, the form is withdrawn from the tank of dispersion. Thereafter, the coating of latex is allowed to dry thoroughly. This may be accomplished wholly upon the dipping form itself, although, in order to release the dipping forms as quickly as possible and return them to the dipping machine, I prefer to transfer the partially dried rubber coating to a secondary drying form and to maintain the coating on this form until the water has been evaporated. The rubber of the envelopes may be slightly vulcanized provided it is not cured to such an extent as to substantially lack the properties made use of in this invention.

After the envelopes have been formed they may be rendered heat shrinkable by stretching them at ordinary room temperature or at a lower temperature. The stretching should be carried out equally in all directions so that when the envelopes are later shrunk they will shrink evenly and uniformly. Stretching can most conveniently be effected by merely gathering the open end of the envelope about an inflating nozzle and distending it by blowing in compressed air until the rubber envelope has been enlarged to such a size that the carcass may easily be placed therein. In this case, the envelope, except for the neck portion, which was held against the nozzle, will be inflated to a fairly uniform degree. If projections have been formed on the envelope so that pockets are formed to enclose the legs or neck of the animal, the rubber in these projections will not be distended to so great a degree and will be thicker and stronger. Therefore, the rubber in the neck portion of the envelope and in the leg pockets is more able to stand the strain of ligatures which may be used for closing the bag and for tying around the legs to hang up the carcass.

The envelopes may be supplied to the packer before they have been distended, or, in some cases, it may be preferable to distend them at the place of manufacture. If the envelopes are to be handled or shipped before they are applied to the food products they should be dusted with any suitable non-toxic, anti-sticking compound. Since food products are involved, I prefer to use starch as the dusting material.

At the food packing plant, after the animal is slaughtered and properly cleaned and prepared, the carcass is placed in one of my expanded envelopes. If the envelope has been provided with pockets, the legs of the beef quarter, mutton or pork are fitted into the pockets.

After the meat product is in place in the envelope, the air remaining in the envelope should be largely removed. This may be accomplished by inserting a vacuum nozzle within the neck of the envelope, gathering the neck of the envelope tightly about the nozzle and withdrawing the air through the nozzle. The envelope may then be twisted below the nozzle, the nozzle withdrawn and the envelope hermetically sealed. With some products, particularly the larger cuts of meat, it may be preferable to first seal the neck of the envelope hermetically and to then withdraw the air through an opening provided in the envelope especially for this purpose. Such an opening may conveniently be provided by forming a small tube as an integral part of the envelope. After the envelope is in position on the food product, the end of this tube may be cut away or punctured to receive an evacuating nozzle.

I then heat the wrapped carcass very briefly in order to permit the restoring forces in the bag to become active and cause the bag to shrink down into firm engagement with the meat, driving out most or all of the air remaining in the bag and forming a tight, close-fitting skin over the major part of the surface of the product. Any air remaining in the bag is trapped in isolated relatively small pockets. The heating may be accomplished by dipping the covered carcass for no more than 1 or 2 seconds into water heated to a temperature of about 130° F. if an envelope of unvulcanized rubber is used. Alternatively, the carcass may be passed through a hot room on its way to the cooler. Only this momentary heating is necessary to shrink the envelope down against the carcass so tightly that it appears almost as a transparent skin and hardly any spot is left on complicated cuts where the envelope is not in close contact with the meat. This tight fit over the major part of the surface of the meat leads to an efficient heat transfer between the meat cut and the refrigerating medium permitting rapid freezing of the meat.

I have found that it is unnecessary to carry out evacuation of the envelope as a separate operation when the product to be packaged is generally convex in shape and is relatively free from concavities on its surface. In this case, the shrinking of the envelope by heating will remove the air to an extent sufficient for all practical purposes. As the envelope shrinks down it moves into intimate close-fitting contact with all of the convex portions of the surface driving out substantially all of the air except that trapped in the surface concavities. These are bridged over by the envelope in a way to form a package having an attractive, commercially desirable appearance.

If desired, the envelope may be first shrunk and then evacuated. This procedure is especially useful with large articles since it permits a more uniform distribution of the envelope material over the surface of the article. Evacuation of the envelope before it has been shrunk may result in the envelope being drawn into contact with the article over spaced areas only, with the formation of folds and wrinkles between these areas. When the envelope material is heated to cause it to shrink, friction between the surface of the article and the areas of the envelope lying in flat contact with it may interfere with the removal of the folds and wrinkles. This difficulty may be overcome by shrinking the envelope before it is evacuated. As the envelope shrinks it comes down into contact with the article uniformly and no substantial amount of sliding is necessary to bring it into its final close-fitting position by withdrawal of the air.

The neck or evacuating nipple may be sealed off hermetically in any desired manner, as with a cord tie or a twisted metal wire or clip. When the preferred material, modified or unmodified unvulcanized rubber, is used, the opening is preferably closed by heat-sealing the material at this point. This may be effected by compressing the material between clamping members heated to about 100° to 230° F. for a few seconds, until the material has coalesced under the influence of the heat and pressure. Completely airtight seals may be formed in this manner, at a considerable saving in time and cost as contrasted with other methods of sealing.

The invention may be more readily understood by reference to the drawing. Figs. 1 and 2 illustrate a form 10, suitable for making an envelope designed to enclose a mutton. It comprises a V-shaped web portion 11 bearing two rounded marginal flanges 12 and 13. If desired, a small projecting pin 14 may be attached to the web so that a small tube is formed on the envelope which is used for evacuating the air. Although it is not necessary, since a plain bag-shaped envelope draws down tightly against meats of any shape, I prefer to cut away a portion of the web as shown in the figure so that the flanges 12 and 13 together with the remaining portions 15 and 16 of the web may form pockets in the envelope which ultimately will receive the hind legs of the animal. The fore-legs of the carcass are bent down against the breast and no pockets need be made to receive them.

The V-shape, better illustrated in Fig. 2 (a section on the line 2,2 of Fig. 1), is given to the dipping form merely to conserve space in the tank. The over-all size of the dipping form is a matter of choice. If a sufficiently thick coat of latex is allowed to build up on the form, I find it possible to use forms possessing only ⅛ of the linear dimensions of the carcass which ultimately will be covered by the envelope, but, forms which are reduced from ½ to ⅛ of the size of the animals are found to be satisfactory.

Another form, 17, suitable for making an envelope for enclosing a quarter of beef is shown in Figs. 3 and 4. In this case, a web 18 of C section (Fig. 4) is provided with rounded marginal flanges 19 and 21. The small pin 22 is attached to the web at any convenient location to form the evacuating connecting tube. Parts of the marginal flange 21 and a portion of the web 18 have been cut away so that the remaining portion of the web together with the marginal flange 19 will form the leg pocket of the envelope.

Fig. 5 illustrates the appearance of the envelope 24 as the inflation proceeds. The open end of the envelope 24 is gathered about the inflation nozzle 25 by a rubber band 26. Air is admitted through the pipe 27 and controlled by a valve (not shown). The body portion 28 of the envelope is shown distended to a material degree, but the leg pockets 29 and 31 are not distended to the same extent. As previously stated, the rubber in the neck portion 32 of the envelope and in the legs 29 and 31 remains permanently thicker than in the body portion 28. The distension, however, of the whole envelope is great enough to allow it to enfold the whole carcass easily and loosely.

Fig. 6 illustrates the appearance of the envelope 24 in place on the mutton. The neck 32 has now been closed by the string or tape wrapping 33 and hanging loops 34, 34 have been tied about the leg pockets 29 and 31.

After the envelope has been shrunk into contact with the meat by heating, the meat may merely go to a chill room and be chilled according to conventional practice, but, in all cases to secure the best results from my invention, the envelope should be left on the meat until it must be cut up for sale by the retail butcher.

At the temperatures of chilled beef my contracted envelopes possess very little resilience and will not tear if, inadvertently, a hook or nail is thrust into the carcass. On the contrary, merely a small puncture is made. It is, therefore, not necessary to replace a punctured bag since only a very small area of the meat will be deleteriously affected.

If the meats are frozen, the temperature falls below the so-called "freezing" temperature of the unvulcanized rubber envelope material. Then, a dead, inelastic skin is formed which, although scarcely more than .002" or .003" thick, resists scraping and abrasion to an astonishing degree. It will not pull away from any puncture or tear and, in effect, the carcass is protected by an inelastic, liquid-impervious, air-tight envelope in intimate contact with the carcass throughout its whole extent.

I find it best to retain the envelope on frozen meat at least until all thawing is complete. The meat may be thawed by hosing the covered carcass with temperate water or it may be hung in a room at normal temperatures. Although the bag itself, as soon as it comes to normal temperature, may be stripped away from the meat without difficulty, it is much better to leave the bag on the meat until all of the meat has thoroughly thawed. The moisture condensed from the air by the cold meat collects on the outside of the envelope and thus can not soak into the surface of the meat and spoil its natural bloom. This also prevents not only possible contamination of the meat by the thawing water, but also prevents "drip" to such a degree that frozen beef thawed in the envelopes closely approaches the quality of chilled beef.

Although I have described my invention as applied to meat carcasses, it is obvious that it may be applied in an equally successful manner to the preservation of poultry, fish, and other foodstuffs, and that, in the case of these smaller products, it is not necessary to package the individual pieces separately. In the latter case, the envelope can be inserted in a box with its open end turned down over the margin of the box. The produce may then be packed in the envelope as closely as possible and the open end closed and secured with a string or tape wrapping. Thereafter, the bulk package may be placed either in chilling rooms or under a stream or spray of refrigerating liquid.

The ease of manufacture, low cost, the ease of application, and the surety of protection which my new envelopes give, now make it possible to enclose beef and all foodstuffs in envelopes in such a manner that they may be frozen directly in a spray of brine or refrigerant and shrinkage and desiccation may be avoided throughout the whole period of their subsequent storage. The contractability of the envelope and the fact that it pulls down into tight contact with the meat forms a package through which the meat may be inspected without the necessity for removing the envelope. This last is particularly important where the sale of the whole package is made to the ultimate consumer, as in the case of small cuts of beef or poultry.

This application is a continuation in part of my application filed June 7, 1938, S. N. 212,359, now Pat. No. 2,240,245 entitled "Process and articles for preserving perishable foodstuffs."

I claim:

1. The process of preserving meat and other perishable foodstuffs by refrigeration which comprises providing a flexible envelope of unvulcanized rubber expanded to a material extent, enclosing the foodstuff in the envelope, sealing the envelope and removing air therefrom, heating the rubber to cause it to approach its unstretched condition and to pull itself into firm, substantially wrinkle-free contact with the foodstuff, and subjecting the covered foodstuff to refrigeration temperatures.

2. The process of preserving meat and other perishable foodstuffs by refrigeration which comprises providing a flexible envelope of unvulcanized rubber expanded to a material extent, enclosing the foodstuff in the envelope, sealing the envelope and removing air therefrom, heating the rubber to cause it to approach its unstretched condition and to pull itself into firm, substantially wrinkle-free contact with the foodstuff, and immersing the covered foodstuff in a refrigerant fluid to form a skin of inelastic rubber about the foodstuff, cold-storing the foodstuff and retaining the covering in place throughout the storage period.

3. The process of preserving meat and other perishable foodstuffs by refrigeration which comprises providing a flexible envelope of unvulcanized rubber expanded to a material extent, enclosing the foodstuff in the envelope, sealing the envelope and removing air therefrom, heating the rubber to cause it to pull itself into firm substantially wrinkle-free contact with the foodstuff, freezing the covered foodstuff, cold-storing the package and thawing the foodstuff while maintaining the covering thereon.

4. As an article of manufacture a marketable package comprising a frozen foodstuff tightly enclosed in a seamless envelope formed of unvulcanized rubber, said envelope conforming to the general shape of the foodstuff and exerting a compacting tension thereon.

5. The process of preserving perishable foodstuff by refrigeration which includes providing a flexible moisture impermeable envelope which has been stretched to a material extent and to a size larger than the foodstuff and retains substantially its stretched size at or below normal room temperatures and is capable of subsequently materially contracting when heated and again becoming dead and inelastic at refrigerating temperatures, placing the foodstuff in the envelope, causing the envelope to contract by the action of heat into contact with the foodstuff and thereafter storing the foodstuff in the envelope at refrigerating temperatures.

6. The process of preserving perishable foodstuff by refrigeration which includes forming a moisture impermeable envelope of a material capable of being stretched to a material extent and remaining substantially at its expanded size at or below normal room temperatures, and of subsequently materially contracting when heated and again becoming dead and inelastic at refrigerating temperatures, said envelope being much smaller than the foodstuff to be placed therein, stretching said envelope to a size larger than the foodstuff, placing the foodstuff in the envelope, causing the envelope to contract by the action of heat into contact with the foodstuff, and thereafter storing the foodstuff in the envelope at refrigerating temperatures.

7. The process of preserving perishable foodstuff by refrigeration which includes providing a moisture impermeable flexible envelope which has been stretched to a material extent and to a size larger than the foodstuff and retains substantially its stretched size at or below normal room temperatures and is capable of subsequently materially contracting when heated and again becoming dead and inelastic at refrigerating temperatures, placing the foodstuff in the envelope, causing the envelope to contract by the action of heat into contact with the foodstuff and thereby driving out the air, and thereafter storing the foodstuff in the envelope at refrigerating temperatures.

HENRI MARIE JOSEPH TYREL DE POIX.